United States Patent
Tseng et al.

(10) Patent No.: US 10,158,225 B2
(45) Date of Patent: Dec. 18, 2018

(54) ESD PROTECTION SYSTEM UTILIZING GATE-FLOATING SCHEME AND CONTROL CIRCUIT THEREOF

(71) Applicant: TAIWAN SEMICONDUCTOR MANUFACTURING COMPANY LIMITED, Hsinchu (TW)

(72) Inventors: Jen-Chou Tseng, Hsinchu County (TW); Chien-Fu Huang, Changhua County (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 204 days.

(21) Appl. No.: 15/379,620

(22) Filed: Dec. 15, 2016

(65) Prior Publication Data
US 2017/0098935 A1    Apr. 6, 2017

Related U.S. Application Data

(63) Continuation of application No. 14/620,382, filed on Feb. 12, 2015, now Pat. No. 9,537,306.

(51) Int. Cl.
*H02H 9/04* (2006.01)

(52) U.S. Cl.
CPC ............ *H02H 9/046* (2013.01); *H02H 9/04* (2013.01)

(58) Field of Classification Search
CPC ................................ H02H 9/046; H02H 9/04
See application file for complete search history.

(56) References Cited

U.S. PATENT DOCUMENTS

| | | | |
|---|---|---|---|
| 6,118,303 A | 9/2000 | Schmitt et al. | |
| 6,424,510 B1* | 7/2002 | Ajit | H01L 27/0266 361/111 |
| 8,514,533 B2* | 8/2013 | Mozak | H01L 27/0285 361/56 |
| 8,958,186 B2* | 2/2015 | Lefferts | H02H 9/046 361/56 |
| 9,197,061 B2* | 11/2015 | Russ | H02H 9/046 |
| 2005/0073348 A1 | 4/2005 | Hinterscher | |
| 2009/0097174 A1* | 4/2009 | Ker | H01L 27/0266 361/56 |
| 2010/0123985 A1 | 5/2010 | Wang et al. | |
| 2011/0051298 A1* | 3/2011 | Lai | H01L 27/0266 361/56 |
| 2014/0198414 A1 | 7/2014 | Worley et al. | |
| 2015/0288174 A1 | 10/2015 | Di Sarro et al. | |

* cited by examiner

*Primary Examiner* — Scott Bauer
(74) *Attorney, Agent, or Firm* — Jones Day

(57) ABSTRACT

An ESD protection system for an internal circuit is disclosed. The ESD protection system comprises an ESD clamping device connected between a pad and a ground of a first domain); a pre-driver having an output coupled to a gate of the ESD clamping device); an ESD control circuit connected between the pre-driver and the internal circuit; and a transient detection unit coupled to the ESD control circuit, configured to detect an ESD transient from the pad of the first domain. The transient detection unit outputs an first signal to the control circuit upon detection of an ESD transient. In response, the control circuit causes the pre-driver to output a high-impedance state at the gate of the ESD clamping device, thereby floating the gate thereof.

20 Claims, 8 Drawing Sheets

ESD PROTECTION SYSTEM UTILIZING GATE-FLOATING SCHEME AND CONTROL CIRCUIT THEREOF

CROSS-REFERENCE TO RELATED APPLICATIONS

This application is a continuation application of U.S. application Ser. No. 14/620,382 entitled "ESD PROTECTION SYSTEM UTILIZING GATE-FLOATING SCHEME AND CONTROL CIRCUIT THEREOF" filed on Feb. 12, 2015, which is incorporated herein by reference in its entirety.

TECHNICAL FIELD

The present invention relates generally to integrated circuit (IC) design, and, more particularly, to an ESD protection circuit that employs a gate-floating scheme.

BACKGROUND

Electrostatic protection is an important issue for the protection of integrated circuits. Since an electrostatic charge has a relatively high voltage (maybe thousands of volts), electrostatic discharge (ESD) protection circuits are required to protect semiconductor device from being damaged by the electrostatic charge.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
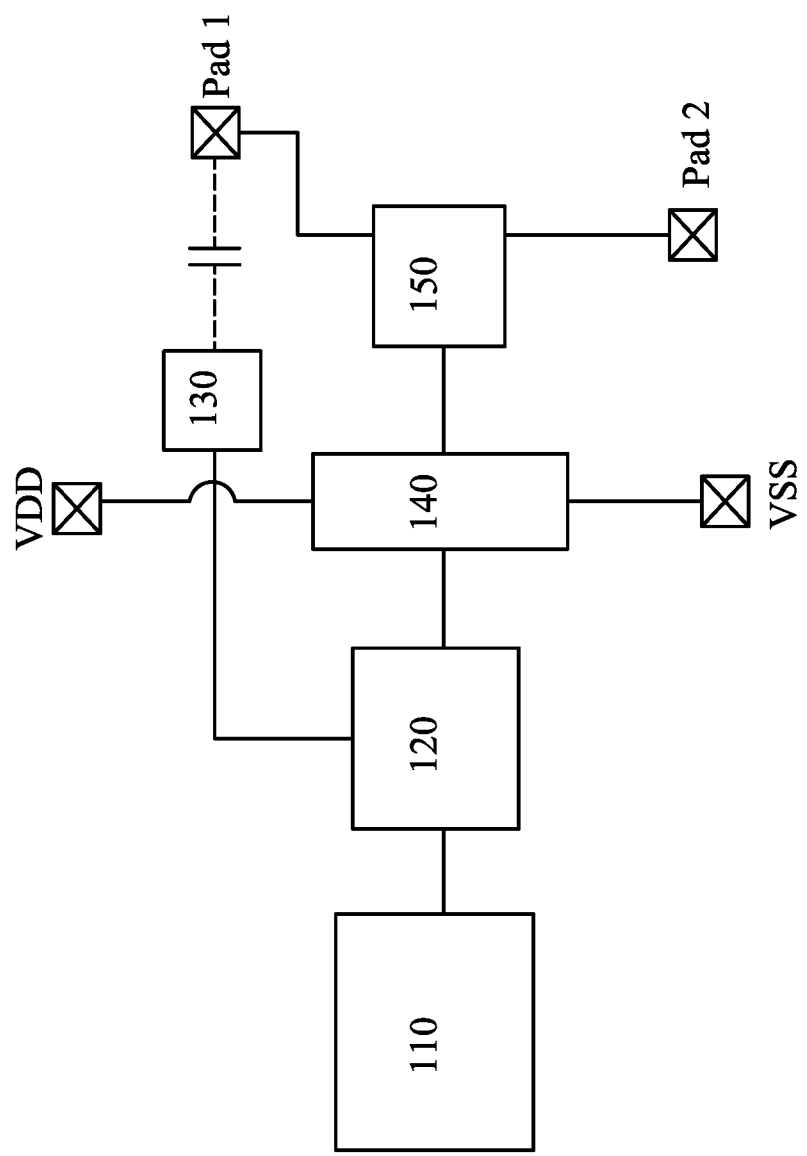
FIG. 1 shows a block diagram of a portion of an integrated circuit device utilizing an ESD protection circuit in accordance with embodiments of the instant disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the handling of semiconductor chip packages, electrostatic discharge (ESD) may result in damage to the semiconductor devices on the chip. On-chip protection circuits are used to provide a safe discharge path. The protection circuit is basically a switch which is off during normal circuit operation and turns on during an ESD event when a high voltage is present at a pin of the chip.

Metal oxide semiconductor (MOS) devices, such as the ground-gate n-type MOS devices (GGnMOS) in multi-finger configuration, have been effectively utilized as an ESD protection device. However, the gate-grounded scheme may not be the best option in certain applications. For instance, the gate-grounded scheme often utilizes a gate coupling technique to boost the voltage at the gate of an ESD clamping device (e.g., nMOS), in which the gate of the ESD clamping device is coupled to a local VDD pad through a gate-coupling circuitry. However, such gate-boosting technique is rendered non-applicable for a circuit that lacks a pull-up path (e.g., an open-drain output circuit), where the absence of a pull-up path results in the inability to generate sufficient voltage to drive the gate of the ESD clamping device. In addition, the gate-grounded scheme sometimes may not work as intended in a cross power domain circuit. Particularly, in an ESD condition, the ESD acts as a brief power supply for one or more randomly selected pads, while the rest of the pads remain floating or grounded. In such a random condition, the intertwining interactions between components in a complex circuit device may affect the operation of an ESD protection module in an unintended manner.

Figure 7:
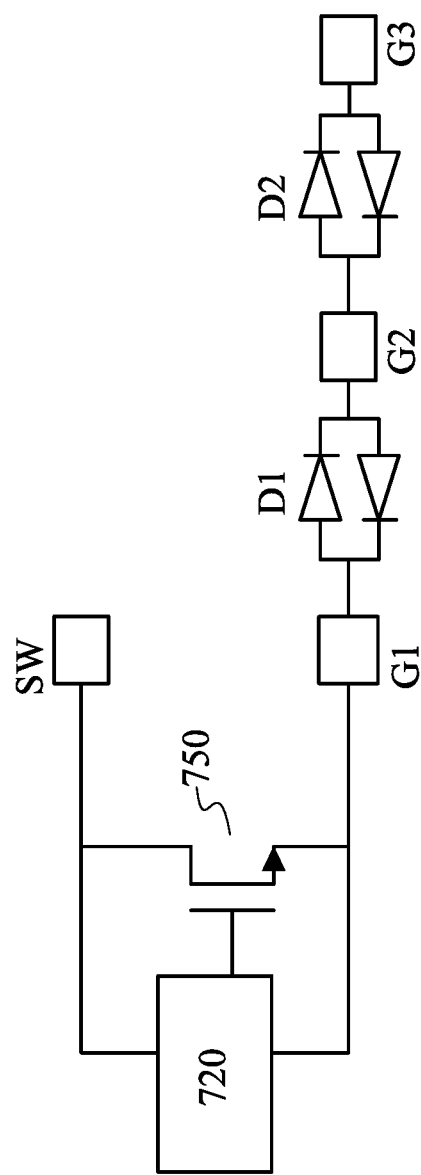
FIG. 7 is a schematic diagram showing an integrated circuit device utilizing a gate-coupled ESD protection scheme.

FIG. 7 is a schematic diagram showing an integrated circuit device utilizing a gate-coupled ESD protection scheme. Specifically, the exemplary device includes a cross power domain circuit portion that comprises an ESD switch device 750 arranged between a power supply pad SW and a plurality of ground pads (e.g., G1, G2, G3) and diode strings (e.g., D1, D2). A trigger circuit 720 is connected between the SW and GND1 pads, and is coupled to the gate of the ESD switch device 750 for boosting the gate voltage. Typically, a trigger voltage of the trigger circuit 720 is selected in accordance with the potential difference between the SW and the G1 pad. That is, when an ESD event occurs between the G1 and the SW pads, a transient associated voltage will be sufficient to activate the trigger circuit 720, i.e., boosting the voltage of the gate of the ESD switch device 750, thus triggering channel conduction thereof to dissipate the associated ESD energy. However, when an ESD even occurs between the G3 (or even the G2) and the SW pads, a voltage division caused by the diode strings (e.g., D1/D2) may result in an insufficient voltage for the trigger circuit 720 to perform a proper gate boosting operation.

Figure 8:
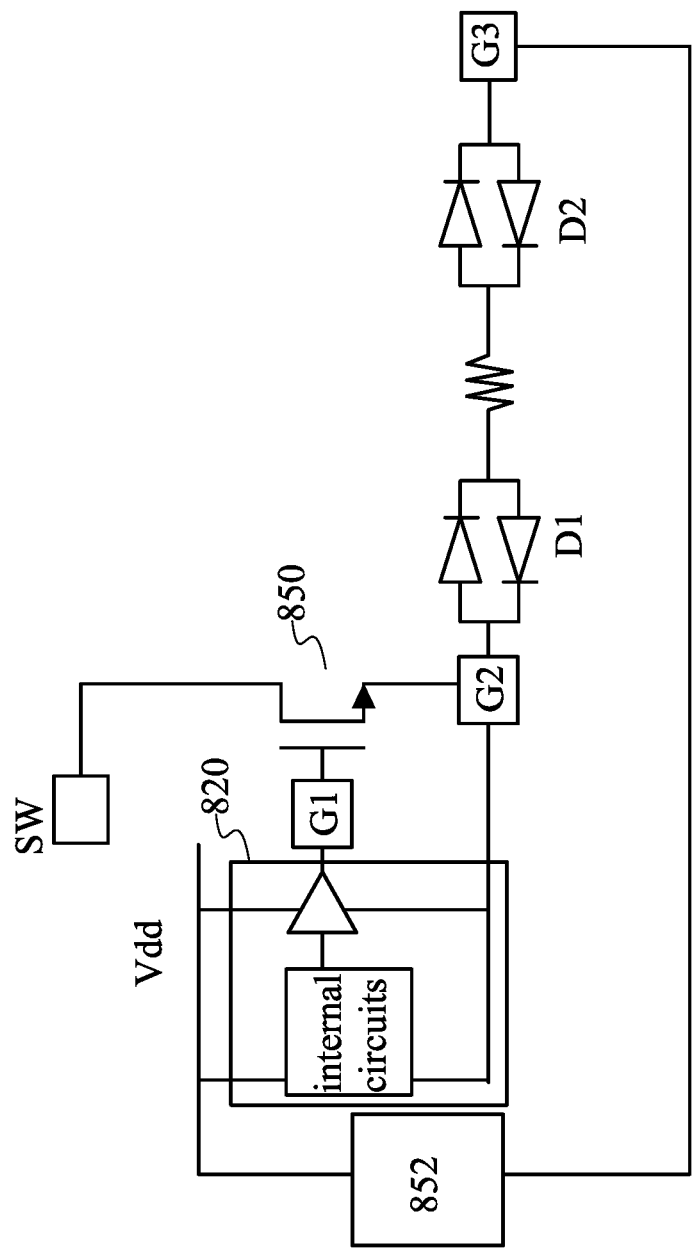
FIG. 8 is a schematic diagram showing an integrated circuit device utilizing a gate-coupled ESD protection scheme.

FIG. 8 is a schematic diagram showing an integrated circuit device utilizing a gate-coupled ESD protection scheme. Specifically, the exemplary device includes a cross power domain circuit portion that comprises an ESD switch device 850 arranged between a power supply pad SW (e.g., of a first power supply domain) and a ground pad G2. The ground pad G2 is further in connection with a ground pad G3 through diode strings (e.g., D1, D2). The gate of the ESD switch device 850 is coupled to a VDD power line (e.g., of a local power supply domain) through a ground pad G1 and a circuit 820. In addition, an active ESD clamp 852 is implemented locally between the Vdd power line and the ground pad G3. During an ESD event, it is possible for an efficient local ESD device (such as the active ESD clamp 852) to cause a voltage division that drives an ESD voltage below the intended triggering threshold at the trigger circuit 820, thus hindering the operation thereof.

In comparison, a gate-floated ESD scheme outperforms the gate-grounded scheme in certain applications. For instance, in some cases, a higher voltage (e.g., Vgs) may be required for an ESD protection device that employs the gate-grounded scheme. In comparison, driving the switch device's (e.g., an NMOS device) gate to open (e.g., to a high impedance condition) may be more readily achieved than boosting the gate voltage thereof to a high enough level for triggering channel conduction. When the gate of the switch device is floated from the rest of the circuit, the channel action thereof may be predominately dictated by the ESD induced capacitive (e.g., Cgd) voltage, thus triggering the gate of the switch into a conductive state to facilitate the dissipation of the associated ESD energy.

FIG. 1 shows a block diagram of a portion of an integrated circuit device utilizing an ESD protection circuit in accordance with some embodiments of the instant disclosure. Particularly, exemplary integrated circuit device includes an internal circuit 110 having an output thereof connected to an ESD control circuit 120; a transient detection unit 130 connected to the ESD control circuit 120; a pre-driver 140 connected to an output of the ESD control circuit 120; and an ESD clamping device 150 connected to an output of the pre-driver 140.

The internal circuit 110 typically comprises sophisticated circuit elements that are particularly vulnerable to ESD damage, and is a primary subject of ESD protection. The ESD clamping device 150 may be a switch device having sufficient current conduction capability. The ESD clamping device 150 may be provided between a bonding pad of a first power supply domain (e.g., a pad1 of a global power supply domain) and a ground thereof (e.g., a pad2 of the first domain). In some embodiments, the ESD clamping device 150 may be a metal-oxide-semiconductor field effect transistor (MOSFET) device of a suitable channel type. An ESD MOSFET device typically comprises an parasitic bipolar junction transistor (BJT) inherently connected in parallel there-to, and may be utilized to provide a secure discharge path for ESD transients under ESD stress. In some embodiments, the ESD clamping device 150 is provided in the form of an n-type MOSFET in multi-finger configuration. The extended area between the multiple finger structures in a multi-finger ESD MOSFET device helps to spread a sudden stress caused by the ESD transient, thus increasing an overall robustness of the ESD protection mechanism.

The pre-driver 140 may be an output driver connected to the ESD clamping device 150 and configured to provide control there-to. For instance, the pre-driver 140 may be connected to a gate of the ESD clamping device 150. Particularly, the pre-driver 140 may be configured to receive an output signal from the internal circuit 110 during normal operation, and accordingly controls the operation of the ESD clamping device 150 (e.g., an I/O transistor) to enable signals to/from pad1. The pre-driver 140 is typically connected between a VDD pad and VSS pad of a second power supply domain (e.g., a local power supply domain), as shown in FIG. 1. In some embodiments, the pre-driver 140 may be implemented as a pair of MOSFET devices with opposite channel types, with the drain nodes thereof connected to each other and forming an output to a gate of the ESD clamping device 150.

The transient detection unit 130 is arranged in capacitive coupling with pad1. Particularly, while the transient detection unit 130 may be not in direct physical connection with pad1, it is configured in such a way that, upon the occurrence of an ESD event on pad1, the high magnitude of the ESD transient would induce an capacitive coupling between pad1 and the transient detection unit 130. Thus, the transient detection unit 130 poses minimum effect on the overall operation of the circuit under normal operating conditions. However, under ESD stress, the ESD transient acts as a brief power supply for one or more pads in an isolated IC, while the other pads remain floating or grounded. Since the other pads are grounded, when ESD acts as a power supply (typically at a randomly selected pad), the protection mechanism may act differently from the way it does during normal operation. Particularly, the capacitive coupling to pad1 may enable the provision of an induced voltage to the transient detection unit 130 when an ESD event occurs, which in turn powers the operation of the ESD protection mechanism. Upon detection of an ESD transient, the transient detection unit 130 outputs an indication signal to the control circuit 120, so as to trigger subsequent operations of the ESD protection mechanism.

The ESD control circuit 120 is coupled between the internal IC 110 and the pre-driver 140. The control circuit 120 is further configured to receive an output from the transient detection unit 130. The ESD control circuit 120 may comprise circuitries configured to cause the pre-driver 140 to output a high-impedance state at the gate of the ESD clamping device 150 in response to an output of the transient detection unit 130 upon the detection of an ESD stress condition, thereby disconnecting (floating) the gate of the ESD clamping device 150 from the rest of the circuitry (e.g., disconnecting the gate thereof from the VDD/VSS pads of the local power supply domain). According to simulations, the gate-floated ESD scheme outperforms the gate-grounded scheme in certain applications, particularly for a fully silicided big switch NMOS device. For instance, in some cases, a voltage Vgs of greater than 3V may be required for an ESD protection device that employs the gate-grounded scheme. Conversely, in such applications, driving the switch device's (e.g., NMOS device) gate to open (e.g., high impedance condition) may be more readily achieved than boosting the gate voltage thereof to a high enough level for triggering channel conduction. As the gate of the switch device is floated from the rest of the circuit, the channel action thereof may be predominately dictated by the ESD induced capacitive (e.g., Cgd) voltage, thus triggering the gate of the switch device into a conductive state to facilitate dissipation of the associated ESD energy.

Figure 2:
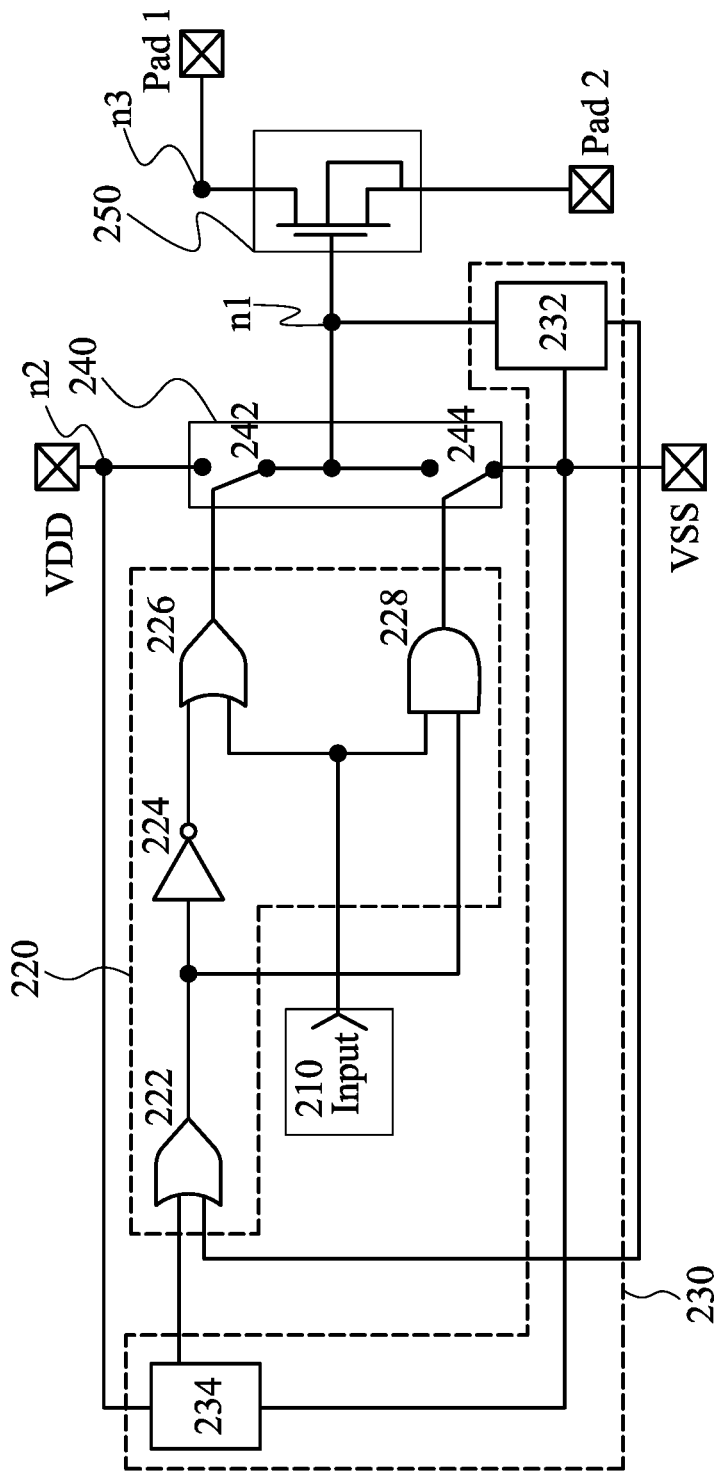
FIG. 2 is a schematic diagram showing a portion of an integrated circuit device utilizing an ESD protection circuit in accordance with embodiments of the instant disclosure.

FIG. 2 is a schematic diagram showing a portion of an integrated circuit device utilizing an ESD protection circuit in accordance with embodiments of the instant disclosure. Particularly, the exemplary integrated circuit device includes an internal circuit 210 having an output thereof connected to an input of an ESD control circuit 220; a transient detection unit 230 connected to another input of the ESD control circuit 220; a pre-driver 240 having a input connected to an output of the ESD control circuit 220; and an ESD clamping device 250 having an input connected to an output of the pre-driver 240.

The internal circuit 210 typically comprises sophisticated circuit elements that are particularly vulnerable to ESD damage, and is the primary subject of ESD protection. The ESD clamping device 250 is provided between a bonding pad (e.g., pad1, through a node n3) and a ground pad (e.g., pad2) of a first power supply domain (e.g., a global power supply domain). The ESD clamping device 250 may be a switch device having sufficient current conduction capability. In some embodiments, the ESD clamping device 250 is a metal-oxide-semiconductor field effect transistor (MOSFET) device of a suitable channel type. The ESD MOSFET device typically comprises an parasitic bipolar junction transistor (BJT) inherently connected in parallel there-to, and may be utilized to provide a secure discharge path for ESD transients under ESD stress. In some embodiments, the ESD clamping device 250 is provided in the form of an n-type MOSFET in multi-finger configuration.

The pre-driver 240 may be an output driver that is connected to the a gate node of the ESD clamping device 250. The pre-driver 240 is configured to receive an output signal from the internal circuit 210 during normal operation, and accordingly controls the operation of the ESD clamping device 250 (e.g., an I/O transistor) to enable signals to/from pad1. particularly, the pre-driver 240 comprises a first switching device 242 and a second switching device 244 connected between connected between a VDD pad and a VSS pad of a second power supply domain (e.g., a local power supply domain). In some embodiments, the first and the second switching devices 242/244 may be implemented as a pair of MOSFET devices with opposite channel types, with the gates thereof respectively coupled to and selectively controlled by the internal circuit 210 and the ESD control circuit 220, while the drain nodes thereof connected to each other and forming an output to the gate of the ESD clamping device 250.

The transient detection unit 230 is arranged in capacitive coupling with pad1. The transient detection unit 230 of the instant example comprises a first transient detection circuit 232 and a second transient circuit 234 capacitively coupled to pad1 of the first power supply domain, respectively. Physically, the first transient detection circuit 232 is connected between the gate of the ESD clamping device 250 (e.g., via a node n1) and the VSS pad of the second power supply domain. In addition, the first transient detection circuit 242 provides an output to the ESD control circuit 220 (e.g., to a first input of a first logical or-gate 222 of the ESD control circuit 220). The second transient detection circuit 234, on the other hand, is connected between the VDD (e.g., through a node n2) and the VSS pads of the second power supply domain, and is likewise configured to provide an input to the ESD control circuit 220 (e.g., to a second input of the first logical or-gate 222). While the transient detection circuits 232, 234 may not be in direct physical connection with pad1, it is configured in such a way that, upon the occurrence of an ESD event on pad1, the surging magnitude of the ESD transient would induce an capacitive coupling there-between. Thus, the transient detection circuit 232/234 poses minimum effect on the overall operation of the circuit during normal operating conditions, as the voltage levels at the respective bond pads (e.g., SW/COM, VDD/VSS) during normal operations are not high enough to activate the transient detection unit 230. However, under ESD stress, the capacitive coupling to pad1 enables the provision of an induced voltage to the transient detection circuit 232/234 that in turn powers the operation of the ESD protection mechanism. Upon detection of an ESD transient, the transient detection circuits 232/234 respectively output an indication signal to the control circuit 220, so as to trigger subsequent operations of the ESD protection mechanism.

The control circuit 220 is coupled between the internal circuit 210 and the pre-driver 240. Moreover, the control circuit 220 is configured to receive outputs from the transient detection circuits 232/234. The ESD control circuit 220 comprises circuitries configured to control the pre-driver 240 to output a high-impedance state at the gate of the ESD clamping device 250 in response to an output of the transient detection unit 230 upon detection of an ESD stress condition, thereby floating the gate of the ESD clamping device 150 from the rest of the circuitry (e.g., disconnecting the gate thereof from the VDD/VSS pads of the local power supply domain). Particularly, the ESD control circuit 220 of the instant example comprises a first logical or-gate 222 having inputs thereof connected respectively to the first and the second transient detection circuits 232, 234 to receive output signals generated thereby. In addition, a logical not-gate 224 having the input thereof connected to the output of the first logical or-gate 222 is provided in the ESD control circuit 220. The control circuit 220 further comprises a second logical or-gate 226 and a logical and-gate 228 having outputs thereof respectively coupled to the pre-driver 240. Particularly, the outputs of the logical or-gate and the and-gate 226/228 may be respectively connected to the gates of the first and second switching devices 242, 244 of the pre-driver 240. On the other hand, the inputs of the second logical or-gate 226 are respectively coupled to an output of the internal circuit 210 and the output of the logical not-gate 224, while the inputs of the logical and-gate 228 are respectively connected to an output of the internal circuit 210 and the output of the first logical or-gate 222.

Figure 3:
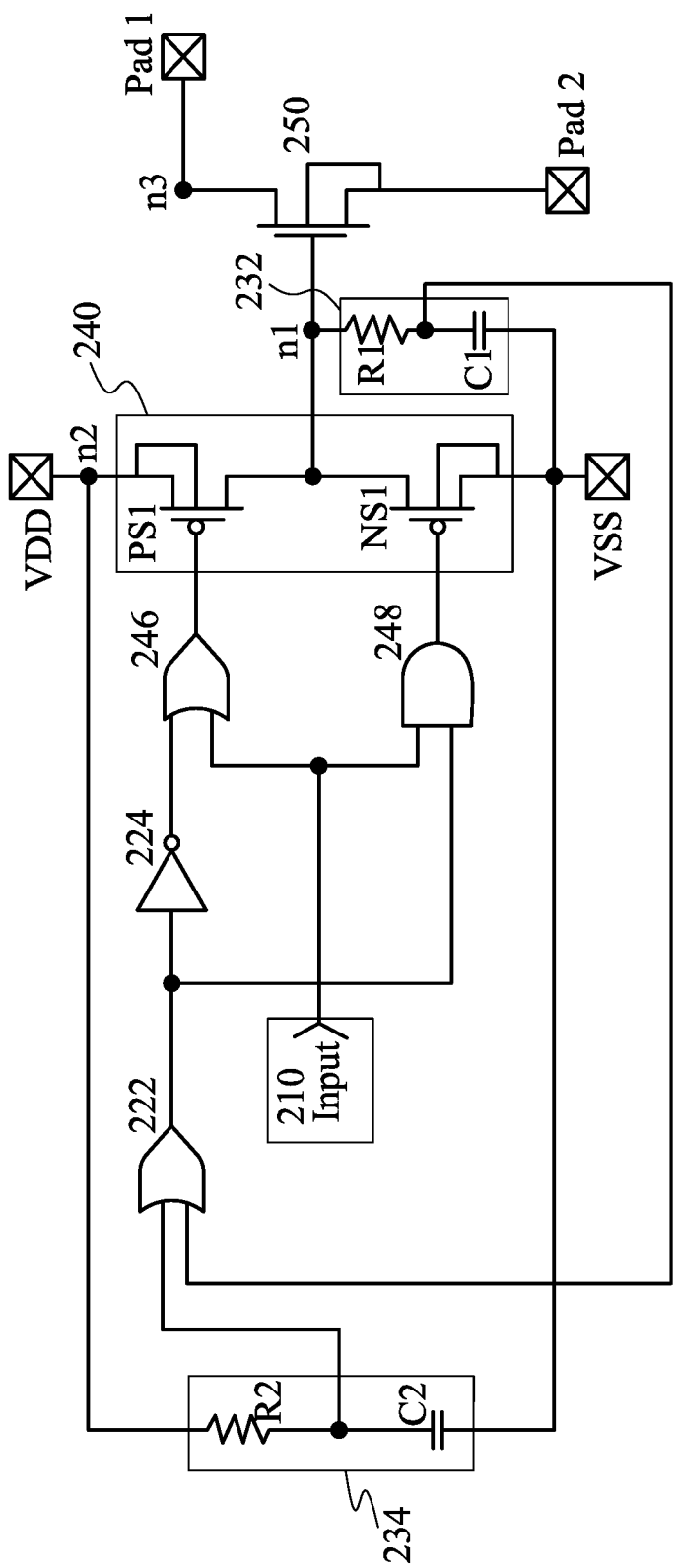
FIG. 3 is a schematic diagram showing a portion of an integrated circuit device utilizing an ESD protection circuit in accordance with embodiments of the instant disclosure during normal operation conditions.

FIG. 3 is a schematic diagram showing a portion of an integrated circuit device utilizing an ESD protection circuit in accordance with embodiments of the instant disclosure during normal operation conditions. The general arrangement of the instant example substantially resembles that of the previous embodiment, and resumes substantially identical item numerals to describe like elements. However, as explicitly shown in FIG. 3, the first and second transient detection circuits 232, 234 in the instant example are implemented by a resistive element R1/R2 and a capacitive element C1/C2, respectively. In addition, the pre-driver 240 is implemented by a p-channel MOSFET device PS1 and an n-channel MOSFET device NS1 connected between the VDD and the VSS pads of the second power supply domain. Particularly, the first transient detection circuit 232 has an output thereof connected to one input of the first logical or-gate 222. Similarly, the second transient detection circuit 234 has an output thereof connected to the other input of the first logical or-gate 222. On the other hand, the gate of the p-channel MOSFET device PS1 is connected to the output of the second logical or-gate 246, while the gate of the n-channel MOSFET device NS1 is connected to the output of the logical and-gate 248.

The voltage levels at the respective bond pads (e.g., SW/COM, VDD/VSS) during normal operations are moderated within a specific operational range. The operational voltage range at which the integrated circuit device is operated is generally not high enough to activate the transient detection circuits 232/234. For instance, the exemplary transient detection circuit 232/234 is configured to output an indication signal representative of an impedance state is substantially inversely proportional to the frequency of an input signal (as the impedance of the transience detection circuit generally follows the relationship $Z=1/(iwC)$, where Z indicates the impedance, w represents the signal frequency, and C indicates the capacitance). Since signals to the second transient detection circuit 234 from the VDD pad during normal operations generally comprise low frequencies, the second transient detection circuit 234 is typically in a high impedance state under normal operating conditions, and accordingly outputs a high-state indication signal (e.g., a signal indicating a value "1") to one of the inputs of the first logical or-gate 222.

The input of a high-state indication signal (e.g., value "1") to the first logical or-gate 222 warrants an output of a high-state indication signal there-from regardless of the value of the other input thereof (e.g., the second input from the output of the first transient detection circuit 232). The output of the first logical or-gate 222 is respectively provided to the input of the logical not-gate 224 and an input of the logical and-gate 248. Accordingly, the logical and-gate 248 receives an high-state indication signal (e.g., value "1") at one of its inputs. On the other hand, the input of a high-state signal from the first logical or-gate 222 to the logical not-gate 224 produces the output of a low state signal (value "0") to an input of the second logical or-gate 246.

Meanwhile, an output of the internal circuit 210 is respectively provided to the second input of the second logical or-gate 246 and the logical and-gate 248. With one input of the second logical or-gate 246 receiving a low-state signal (e.g., "0") and one input of the logical and-gate 248 receiving a high-state signal (e.g., "1"), the switching actions of the p-channel and n-channel MOSFET devices PS1/NS1 of the pre-driver 240 is therefore predominately determined by the output of the internal circuit 210. For instance, if the internal circuit 210 outputs a high-state signal, the first logical gate 246 would receive a low-state signal from the logical not-gate 224 at one of its inputs and a high-state signal from the internal circuit 210 at the other input thereof, thereby generating a high-state signal to the gate of the p-channel MOSFET device PS1. Conversely, if the internal circuit 210 outputs a low-state signal, the first logical gate 246 would respectively receive a low-state signal at each of the inputs, thereby generating a low-state signal in accordance with the output of the internal circuit 210. Similarly, the output of the logical and-gate 228 is dominated by the output of the internal circuit 210 in a similar manner.

Hence, the action of the ESD clamping device 250 is in turn dictated by the control signal of the internal circuit 210 in normal operation mode. Accordingly, the ESD control circuit is effectively deactivated and enters a sleeping mode during normal operation of the integrated circuit device, and therefore poses minimum effect on the overall circuit operations.

Figure 4:
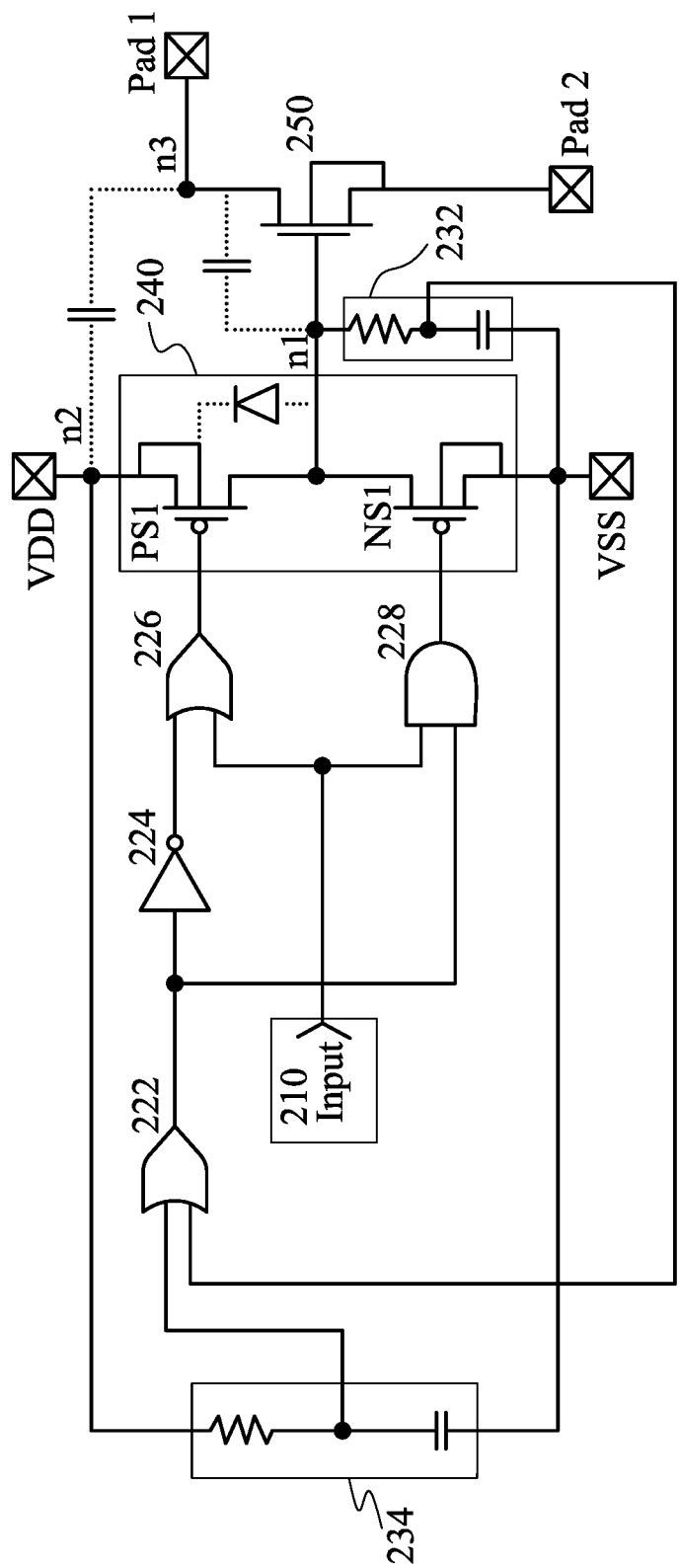
FIG. 4 is a schematic diagram showing a portion of an integrated circuit device utilizing an ESD protection circuit in accordance with embodiments of the instant disclosure under ESD stress.

FIG. 4 is a schematic diagram showing a portion of an integrated circuit device utilizing an ESD protection circuit in accordance with embodiments of the instant disclosure under ESD stress. When an ESD event occurs at pad1 of the first power supply domain, the surging magnitude of an ESD transient would induce capacitive coupling between nodes n1 and n3 (between pad1 and the gate of the ESD clamping device 250), as well as between nodes n2 and n3 (between the VDD pad and pad1). As a result of the capacitive coupling between the abovementioned nodes, coupling voltages may be generated there-between to drive the operation of the ESD protection circuit.

Specifically, as the impedance of the transient detection circuits 232/234 are inversely proportional to the frequency of an input signal, the high frequency signal associated with the ESD transient would cause the transient detection circuits 232/234 to respectively output a low-state indication signal (e.g., a signal indicating a value "0") to the inputs of the first logical or-gate 222. The input of a low-state indication signals to the inputs of the first logical or-gate 222 results in the generation of a low-state indication signal (e.g., "0") at the output thereof. The output of the first logical or-gate 222 is respectively provided to the input of the logical not-gate 224 and an input of the logical and-gate 248. Accordingly, the logical and-gate 248 receives an low-state indication signal at one of its inputs. On the other hand, the input of a low-state signal from the first logical or-gate 222 to the logical not-gate 224 produces the output of a high state signal (e.g., "1") to an input of the second logical or-gate 246.

With one input of the second logical or-gate 246 receiving a high-state signal (e.g., "1") and one input of the logical and-gate 248 receiving a low-state signal (e.g., "0"), the switching actions of the p-channel and n-channel MOSFET devices PS1/NS1 would be predominated by the ESD control circuit. For instance, regardless of the output signal from the internal circuit 210, the output of the second logical or-gate 226 (which receives a high-state signal from the logical not-gate 224 at one of its inputs) will output a high-state signal to the gate of the p-channel MOSFET device PS1. Likewise, the output of the logical and-gate 228 (which receives a low-state signal from the first logical or-gate 222) will output a low-state single to the gate of the n-channel MOSFET device NS1 regardless of the output signal from the internal circuit 210. Moreover, an ESD event as described above may occur while the integrated circuit device is not in operation, thus the output of the internal circuit 210 is usually of low-state in this situation.

In response to the high-state signal from the second logical or-gate 226, the gate of the p-channel MOSFET device PS1 is turned off (which is equivalent to opening the switch at PS1). Similarly, in response to the low-state signal from the logical and-gate 228, the gate of the n-channel MOSFET device NS1 is turned off (which is equivalent to opening the switch at NS1). The opening of the PS1 and NS1 switches causes the pre-driver 240 to output a high impedance state. Accordingly, the pre-driver 240 opens the circuit connection from the VDD/VSS pads to the gate of the ESD clamping device 250, thereby floating the ESD clamping device from the rest of the circuit (e.g., from the VDD/VSS pads of the second power supply domain). As the gate of the NMOS switch device is floated from the rest of the circuit, the channel action thereof becomes predominately dictated by the induced capacitive (e.g., Cgd) voltage, thus triggering the gate of the NMOS switch into a conductive state to facilitate dissipation of the associated ESD energy without gate voltage boosting from the VDD pad.

Figure 5:
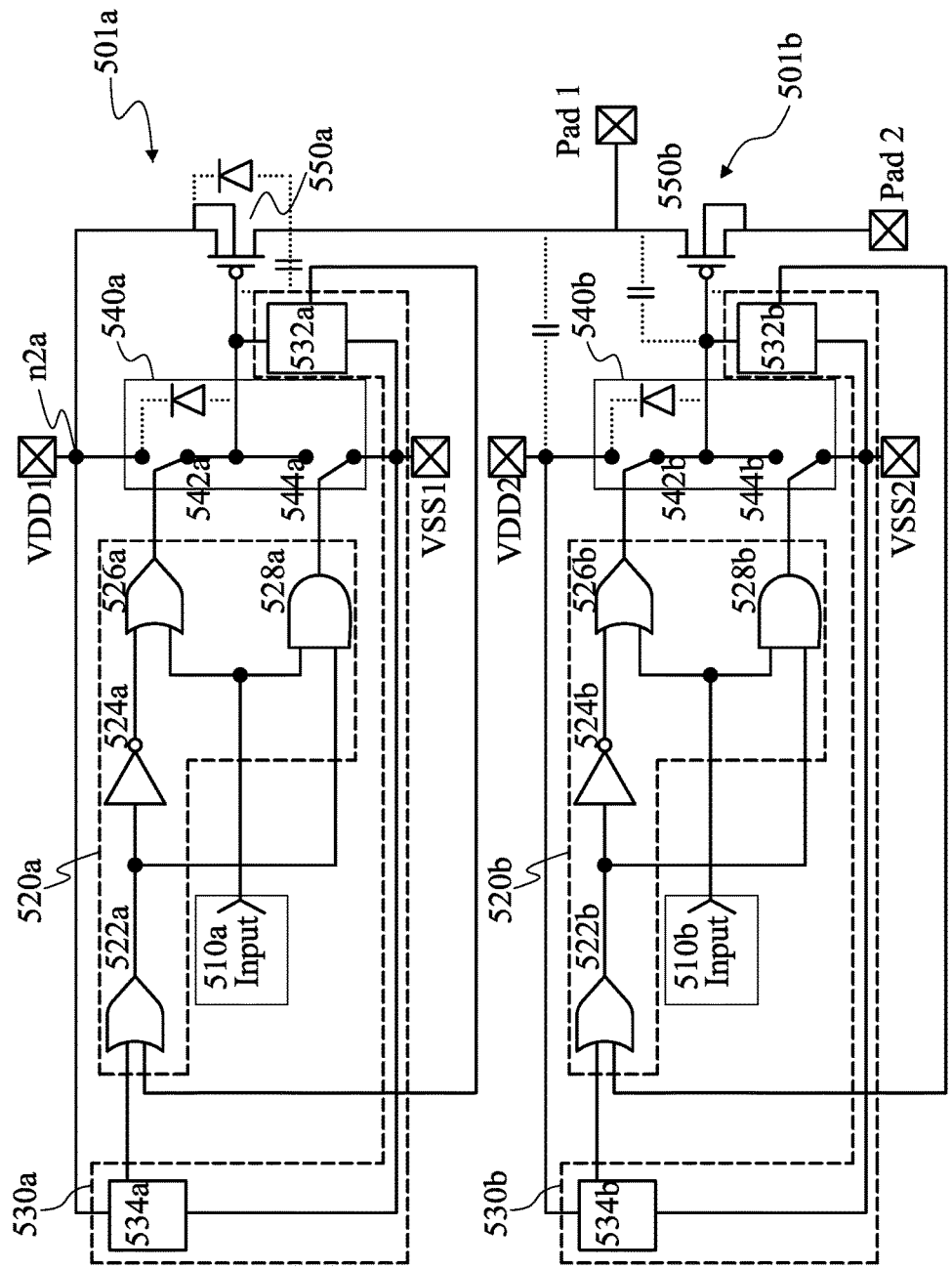
FIG. 5 is a schematic diagram showing a portion of an integrated circuit device utilizing an ESD protection scheme in accordance with embodiments of the instant disclosure.

FIG. 5 is a schematic diagram showing a portion of an integrated circuit device utilizing an ESD protection scheme in accordance with some embodiments of the instant disclosure. Particularly, FIG. 5 shows the implementation of a gate-floating mechanism of an ESD protection circuit in accordance with the instant disclosure in a PMOS pull-high scheme.

Particularly, the integrated circuit device of the instant example comprises a first circuit portion 501a provided with a pull-up path that includes a pull-up device (e.g., a p-type ESD clamping device 550a) and a second circuit portion 501b that utilizes a capacitive coupling scheme as discussed in previous examples. Specifically, a pad1 of a first power supply domain (e.g., a global domain) is respectively connected to the drain nodes of the p-type ESD clamping device 550a and the n-type ESD clamping device 550b. The source node of the p-type ESD clamping device 550a is connected to a node n2a at a VDD1 pad of a second power supply domain (which forms the pull-up path), and the gate node thereof is connected to an output of a first pre-driver 540a. Accordingly, the p-type ESD clamping device 550a acts as a pull-up device in the instant exemplary circuit. Likewise, the source node of the n-type ESD clamping device 550b is connected to a ground pad (e.g., pad2) of the first power supply domain, while the gate thereof being connected to an output of a second pre-dervier 540b.

Each of the first and second pre-drivers 550a/550b comprises a pair of switching devices (e.g., switching devices 542a/544a and 542b/544b), respectively. The switching devices 542a and 544a of the first pre-driver 540a are connected between pads VSS1 and VDD1 of the second power supply domain, while the switching devices 542b and 544b of the second pre-driver 540b are connected between pads VDD2 and VSS2 of a third power supply domain. Depending on application, the VDD1/VSS1 pads and the VDD2/VSS2 pads may be of the same or different power supply domain(s). The switching devices 542a/544a (likewise, 542b/544b) may be switch devices of opposite conductivity types (e.g., p-type MOSFET and n-type MOSFET).

A first transient detection unit 530a is provided in the first circuit portion 501a. The first transient detection unit 530a comprises a first transient detection circuit 532a and a second transient detection circuit 534a. Specifically, the first transient detection circuit 532a is provided between the gate of the first ESD clamping device 550a and the VSS1 pad. A second transient detection circuit 534a is provided between the VDD1 pad and the VSS1 pad. Each of the transient detection circuits 532a/534a is configured to provide an output to an ESD control circuit 520a of the first circuit portion 501a (referred to as the first ESD control circuit 520a), e.g., through connection to the inputs of a first logical or-gate 522a of the first ESD control circuit 520a.

Similarly, a second transient detection unit 530b is provided in the second circuit portion 501b. The second transient detection unit 530b comprises a third transient detection unit 532b and a fourth transient detection unit 534b. Specifically, the third transient detection circuit 532b is provided between the gate of the second ESD clamping device 550b and the VSS2 pad, while the fourth transient detection circuit 534b is provided between the VDD2 and the VSS2 pads. Moreover, the third and the fourth transient detection circuits 532b, 534b are arranged in capacitive coupling with pad1. Each of the transient detection circuits 532b/534b is configured to provided an output to an ESD control circuit 520b of the second circuit portion 501b (referred to as the second ESD control circuit 520b), e.g., through connection to the inputs of a first logical or-gate 522a of the second ESD control circuit 520b. Each of the transient detection circuits 532a/534a may comprise a resistive element and a capacitive element, as depicted in the previous examples.

The first ESD control circuit 520a is coupled between an first internal circuit 510a and the first pre-driver 540a, and is configured to receive output signals from the transient detection circuits 532a/534a. The first ESD control circuit 520a comprises circuitries configured to cause the first pre-driver 540a to output a high-impedance state at the gate of the first ESD clamping device 550a in response to outputs of the transient detection circuits 532a/534a upon detection of an ESD stress condition, thereby floating the gate of the first ESD clamping device 550a. Specifically, the first ESD control circuit 520a comprises a first logical or-gate 522a having inputs thereof connected respectively to the first and the second transient detection circuits 532a, 534a to receive output signals generated thereby. The first ESD control circuit 520a further comprises a logical not-gate 524a having the input thereof connected to the output of the first logical or-gate 522a. Moreover, an logical and-gate 528a and a second logical or-gate 526a having the outputs respectively coupled to the first pre-driver 540a are provided in the first ESD control circuit 520a in arrangements similar to that depicted in the previous examples. Particularly, the outputs of the second logical or-gate 526a and the logical and-gate 528a are respectively coupled to the input nodes of the switching devices 542a, 544a of the first pre-driver 540a. On the other hand, the inputs of the second logical or-gate 526a are respectively coupled to an output of the first internal circuit 510a and the output of the logical not-gate 524a, while the inputs of the logical and-gate 528a are respectively connected to an output of the first internal circuit 510a and the output of the first logical or-gate 522a.

Comparably, the second ESD control circuit 520b is coupled between an second internal circuit 510b and the second pre-driver 540b, and is configured to receive output signals from the transient detection circuits 532b/534b. The second ESD control circuit 520b comprises circuitries configured to cause the second pre-driver 540b to output a high-impedance state at the gate of the second ESD clamping device 550b in response to outputs from the transient detection circuits 532b/534b upon detection of an ESD stress condition, thereby floating the gate of the second ESD clamping device 550b. Specifically, the second ESD control circuit 520b of the instant example employs a comparable arrangement to that of the first ESD control circuit 520a, and comprises a first logical or-gate 522b having inputs connected respectively to the third and the fourth transient detection circuits 532b, 534b. The second ESD control circuit 520b further comprises a logical not-gate 524b having the input thereof connected to the output of the first logical or-gate 522b. Moreover, an logical and-gate 528b and a second logical or-gate 526b having outputs respectively coupled to the second pre-driver 540b are provided in the second ESD control circuit 520b in arrangements similar to that depicted above. Particularly, the outputs of the second logical or-gate 526b and the logical and-gate 528b are respectively coupled to the input nodes of the switching devices 542b, 544b of the second pre-driver 540b. On the other hand, the inputs of the second logical or-gate 526b are respectively coupled to an output of the second internal circuit 510b and the output of the logical not-gate 524b, while the inputs of the logical and-gate 528b are respectively connected to an output of the second internal circuit 510b and the output of the first logical or-gate 522b.

The operation of the exemplary integrated circuit device is substantially similar to the gate-floating ESD protection scheme depicted in the previous examples, and therefore will not be repeated for brevity of disclosure.

Figure 6:
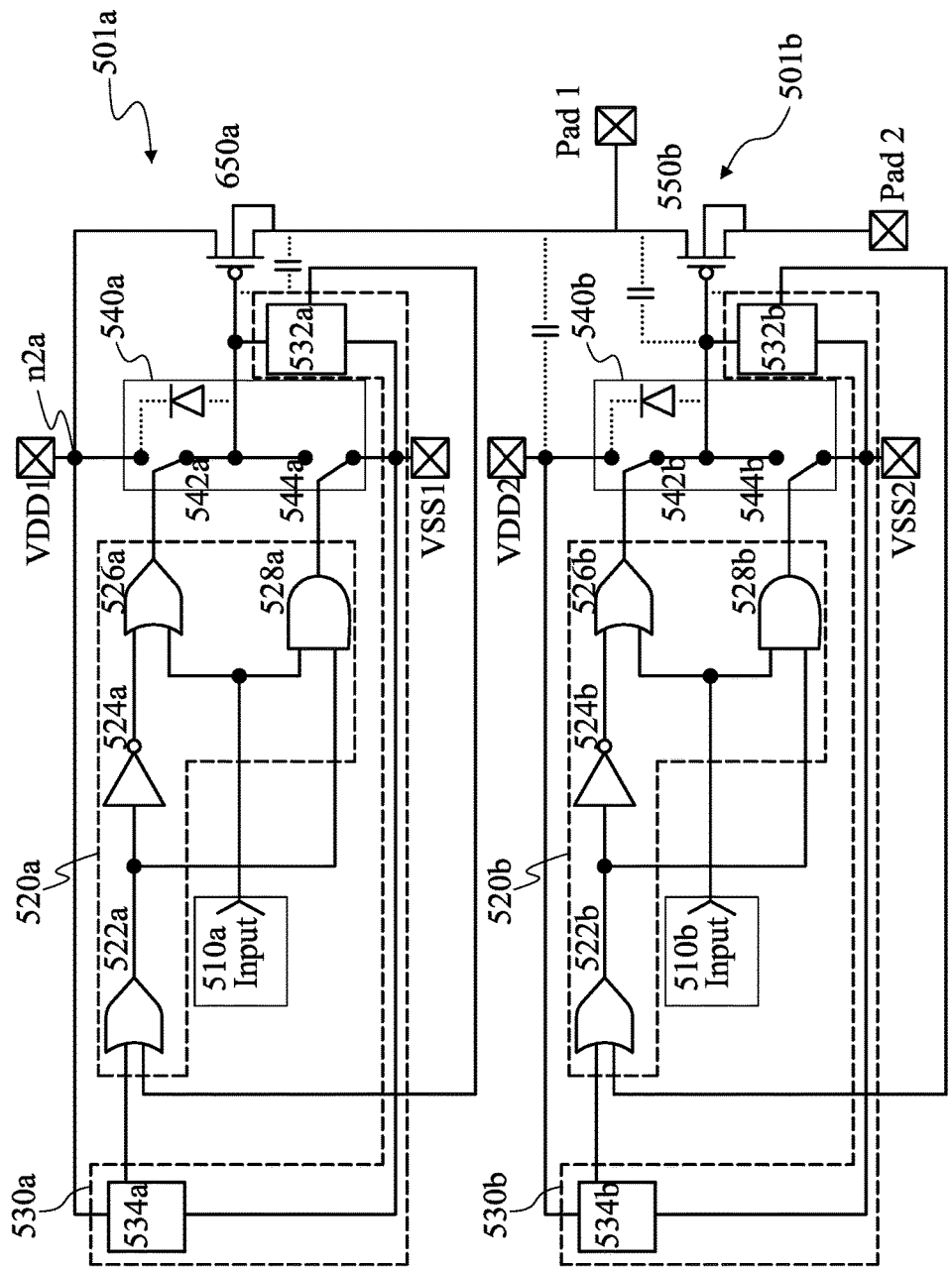
FIG. 6 is a schematic diagram showing a portion of an integrated circuit device utilizing an ESD protection scheme in accordance with embodiments of the instant disclosure.

FIG. 6 is a schematic diagram showing a portion of an integrated circuit device utilizing an ESD protection scheme in accordance with some embodiments of the instant disclosure. Particularly, FIG. 6 shows the implementation of a gate-floating mechanism of an ESD protection circuit in accordance with the instant disclosure in an NMOS pull-high scheme.

Particularly, the integrated circuit device of the instant example comprises substantially identical arrangement as that of the previous example (e.g., of FIG. 5), and differs there-from in that an n-type ESD clamping device 650a (e.g., an n-channel MOSFET device) is employed in place of the p-type ESD clamping device 550a. Because the rest of the component arrangements remains substantially comparable to that of the previous example, repetitive description of the corresponding details will be omitted in favor of the brevity of disclosure.

Accordingly, one aspect of the instant disclosure provides an ESD protection system for an internal circuit. The ESD protection system comprises: an ESD clamping device connected between a pad and a ground of a first domain; a pre-driver having an output coupled to a gate of the ESD clamping device; an ESD control circuit connected between the pre-driver and the internal circuit; and a transient detection unit coupled to the ESD control circuit, configured to detect an ESD transient from the pad of the first domain. The transient detection unit outputs an first signal to the control circuit upon detection of an ESD transient. In response, the control circuit causes the pre-driver to output a high-impedance state at the gate of the ESD clamping device, thereby floating the gate thereof.

Accordingly, another aspect of the instant disclosure provides an ESD protection circuit for an internal circuit coupled to an ESD clamping device connected in a first domain through a pre-driver connected in a second domain. The protection circuit comprises: a transient detection unit; and an ESD control circuit connected between the internal circuit and the pre-driver, configured to receive an output of the transient detection unit. The transient detection unit outputs a first signal upon detection of ESD transient. In response to the first signal, the ESD control circuit causes the pre-driver into a high-impedance state, thereby decoupling the ESD clamping device from the second power supply domain.

Accordingly, one aspect of the instant disclosure provide an ESD protection system. the ESD protection system comprises: a pull-up device connected between a pad of a first domain and a pad of a second domain; a first pre-driver having an output coupled to a gate of the pull-up device; an first ESD control circuit connected to the first pre-driver and configured to receive signal from a first internal circuit; a first transient detection unit coupled to the first ESD control circuit, configured to detect an ESD transient from the pad of the first domain; an ESD clamping device connected between the pad of the first domain and a ground of the first domain; a second pre-driver having an output coupled to a gate of the ESD clamping device; a second ESD control circuit connected to the second pre-driver and configured to receive signal from a second internal circuit; and a second transient detection unit coupled to the second ESD control circuit and configured to detect an ESD transient from the pad of the first domain. The first and second transient detection units respectively output an signal to the first and second ESD control circuits upon detection of an ESD transient. In response, the first and second ESD control circuits respectively cause the first and second pre-drivers to output a high-impedance state at the gates of the pull-up device and the ESD clamping device, thereby floating the gates thereof.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An ESD protection system, comprising:
   an ESD clamping device coupled to a first power supply domain; and
   a circuit coupled to a second power supply domain, the circuit further coupled to a gate of the ESD clamping device,
   wherein when the circuit detects the presence of an ESD transient in the first power supply domain the circuit floats the gate of the ESD clamping device with respect to the first power supply domain.

2. The system of claim 1, wherein the circuit comprises a control circuit and a transient detection circuit.

3. The system of claim 2, further comprising additional protected circuit elements.

4. The system of claim 3, wherein the transient detection circuit is capacitively coupled to a pad in the first power supply domain such that the ESD transient induces a voltage in the transient detection circuit that triggers the control circuit to float the gate of the ESD clamping device.

5. The system of claim 4, wherein the transient detection circuit is electrically coupled between the gate of the ESD clamping device and a source voltage pad of the second power supply domain.

6. The system of claim 5 further comprising a second transient detection circuit capacitively coupled to the pad in the first power supply domain, the second transient device is further electrically coupled the source voltage pad in the second domain and a drain voltage pad in the second domain such that the ESD transient induces a voltage in the second transient circuit that triggers the control circuit to float the gate of the ESD clamping device, wherein both the transient detection circuit and the second transient detection circuit are electrically coupled to the control circuit via a logical or-gate.

7. An ESD protection system, comprising:
   an ESD clamping circuit coupled to a first pad in a first power supply domain;
   a circuit coupled to a second power supply domain, the circuit also coupled to a gate of the ESD clamping circuit,
   wherein in the presence of an ESD transient the circuit provides a high impedance state at the gate of the ESD clamping circuit, thereby decoupling the ESD clamping circuit from the second power supply domain.

8. The ESD protection system of claim 7, wherein the ESD clamping circuit comprises:
   a p-type ESD clamping device coupled to a pull-up node, wherein a drain of the p-type ESD clamping device is coupled to the first pad; and an n-type ESD clamping device coupled to a ground pad, wherein a drain of the n-type ESD clamping device is coupled to the first pad,
wherein the gate of the ESD clamping circuit is a gate of the p-type ESD clamping device or a gate of the n-type ESD clamping device.

9. The ESD protection system of claim 8, wherein the circuit comprises:
one or more ESD transient detection circuits each of which is capable of independently triggering the circuit to provide a high impedance state at the gate of the ESD clamping circuit.

10. The ESD protection system of claim 9, further comprising:
a second circuit coupled to a third power supply domain, the second circuit coupled to the gate of the p-type ESD clamping device, wherein the circuit coupled to the second power supply domain is coupled to the gate of the n-type ESD clamping devices.

11. The ESD protection system of claim 10, wherein the second circuit comprises:
one or more second ESD transient detection circuits each of which is capable of independently triggering the second circuit to provide a high impedance state at the gate of the p-type ESD clamping device.

12. The ESD protection system of claim 11, wherein at least one of the ESD transient detection circuits is capacitively coupled to the first pad in the presence of an ESD transient, or wherein at least one of the second ESD transient detection circuits is capacitively coupled to the first pad in the presence of an ESD transient.

13. The ESD protection system of claim 12, comprising additional protected circuit elements.

14. The ESD protection system of claim 7, further comprising:
a second circuit coupled to a third power supply domain, the second circuit coupled to a gate of a first n-type ESD clamping device in the ESD clamping circuit, the second circuit comprising one or more second ESD transient detection circuits each of which is capable of independently triggering the second circuit to provide a high impedance state at the gate of the first n-type ESD clamping device; and
wherein the circuit coupled to the second power supply domain is coupled to a gate of a second n-type ESD clamping device in the ESD clamping circuit, the circuit comprising one or more ESD transient detection circuits each of which is capable of independently triggering the circuit to provide a high impedance state at the gate of the second n-type ESD clamping device, wherein the gate of the ESD clamping circuit is the gate of the second n-type ESD clamping device; and
wherein the first n-type ESD clamping device is coupled to drain supply node in the third power supply domain, further wherein a source of the first n-type ESD clamping device is coupled to the first pad, further wherein the second n-type ESD clamping device is coupled to a ground pad in the first power domain, further wherein a drain of the second n-type ESD clamping device is coupled to the first pad, and further wherein at least one of the ESD transient detection circuits is capacitively coupled to the first pad in the presence of an ESD transient triggering the circuit to provide a high impedance state at the gate of the second n-type ESD clamping device, or wherein at least one of the second ESD transient detection circuits is capacitively coupled to the first pad in the presence of an ESD transient triggering the second circuit to provide a high impedance state at the gate of the first n-type ESD clamping device.

15. A method of providing ESD protection, comprising:
detecting, by a circuit in a first power supply domain, an ESD transient in a second power supply domain; and
decoupling, by the circuit when an ESD transient is detected, an ESD clamping device in the second power supply domain from the first power supply domain.

16. The method of claim 15, wherein decoupling the ESD clamping device from the first power supply domain includes floating the gate of the ESD clamping device.

17. The method of claim 15, wherein decoupling the ESD clamping device from the first power supply domain includes providing a high impedance state at the gate of the ESD clamping device.

18. The method of claim 15, wherein decoupling the ESD clamping device from the first power supply domain includes driving the gate of the ESD clamping device to open.

19. The method of claim 15, wherein when coupling the ESD clamping device from the first power supply domain includes providing a pull-up path through the ESD clamping device to a drain supply pad in a third power supply domain.

20. The method of claim 15, wherein detecting an ESD transient in a second power supply domain further comprises capacitively coupling a series circuit to a second power supply domain, wherein the series circuit includes a resistive element in series with a capacitive element.

* * * * *